US011890653B2

(12) United States Patent
Ellis, III

(10) Patent No.: US 11,890,653 B2
(45) Date of Patent: Feb. 6, 2024

(54) METHOD FOR CLEANING FIREARM SUPPRESSORS

(71) Applicant: TDA Research, Inc, Wheat Ridge, CO (US)

(72) Inventor: William Wallace Ellis, III, Louisville, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 16/964,139

(22) PCT Filed: Jan. 22, 2019

(86) PCT No.: PCT/US2019/014599
§ 371 (c)(1),
(2) Date: Jul. 22, 2020

(87) PCT Pub. No.: WO2019/147592
PCT Pub. Date: Aug. 1, 2019

(65) Prior Publication Data

US 2021/0031247 A1 Feb. 4, 2021

Related U.S. Application Data

(60) Provisional application No. 62/620,900, filed on Jan. 23, 2018.

(51) Int. Cl.
*B08B 3/12* (2006.01)
*B08B 7/02* (2006.01)
*B08B 7/04* (2006.01)
*B08B 9/032* (2006.01)
*B08B 13/00* (2006.01)
(Continued)

(52) U.S. Cl.
CPC ................ *B08B 3/12* (2013.01); *B08B 7/028* (2013.01); *B08B 7/04* (2013.01); *B08B 9/0326* (2013.01); *B08B 13/00* (2013.01); *F41A 29/00* (2013.01); *B08B 2209/005* (2013.01); *B08B 2209/032* (2013.01); *F41A 21/30* (2013.01)

(58) Field of Classification Search
None
See application file for complete search history.

(56) References Cited

U.S. PATENT DOCUMENTS 5,202,523 A * 4/1993 Grossman ................. B08B 3/12 134/1
9,816,773 B1 * 11/2017 Reis Green ............. F41A 21/30
(Continued)

*Primary Examiner* — Natasha N Campbell
*Assistant Examiner* — Ryan L Coleman
(74) *Attorney, Agent, or Firm* — Brian J Elliott; Grace B Clinger

(57) ABSTRACT

A method for cleaning firearm suppressors comprising: providing a used suppressor having an internal cavity with a fouling material deposited on a surface of the internal cavity; providing a cleaning solution; providing an ultra-sonic probe; introducing the cleaning solution into the internal cavity of the used suppressor; contacting at least part of the ultra-sonic probe with the cleaning solution that is introduced inside the internal cavity of the used suppressor; operating the ultra-sonic probe; removing at least part of the fouling material from the surface of the internal cavity of the used suppressor; and, draining the cleaning solution from the used suppressor.

4 Claims, 9 Drawing Sheets

(51) Int. Cl.
*F41A 29/00* (2006.01)
*F41A 21/30* (2006.01)

(56) References Cited

U.S. PATENT DOCUMENTS

| | | | | |
|---|---|---|---|---|
| 2003/0221701 | A1* | 12/2003 | Hardwicke | F01D 25/002<br>134/1 |
| 2005/0183739 | A1* | 8/2005 | McDermott | B08B 3/12<br>134/1 |
| 2008/0098880 | A1* | 5/2008 | Brugger | F41A 21/325<br>89/14.4 |
| 2013/0338420 | A1* | 12/2013 | Willey | C11D 3/30<br>588/318 |
| 2014/0353076 | A1* | 12/2014 | Bethlenfalvy | F41A 21/30<br>181/223 |
| 2017/0067711 | A1* | 3/2017 | Slack | F41A 21/34 |
| 2017/0146313 | A1* | 5/2017 | Briody | E05B 67/383 |
| 2017/0205175 | A1* | 7/2017 | Garst | F41A 21/30 |
| 2019/0001380 | A1* | 1/2019 | Amaiwa | B29C 33/02 |

* cited by examiner

METHOD FOR CLEANING FIREARM SUPPRESSORS

STATEMENT REGARDING FEDERALLY SPONSORED RESEARCH OR DEVELOPMENT

This invention was made using U.S. government funding through the U.S. Marine Corps Systems Command (MARCORSYSCOM) SBIR Phase I contract #M67854-17-P-6525. The government has certain rights in this invention.

FIELD OF THE INVENTION

The field of the invention relates to a method and apparatus for cleaning firearm suppressors.

BACKGROUND

Firearm suppressors reduce the sound and flash on firing. Sound reduction benefits police and armed forces by reducing the signature of a firearm discharge to decrease the potential for detection by an adversary, while increasing situational awareness (because personnel using suppressed weapon do not have their hearing temporarily impaired by the discharge) and reducing the potential for long-term hearing damage.

We describe a method and apparatus for cleaning firearm suppressors. During use, suppressors collect residue that can impair functioning so that the suppressor does not reduce sound or flash signatures. In some circumstances, fouling may cause the suppressor or firearm to fail during use. Firearm suppressors, particularly sealed suppressors, are difficult to clean. The fouling consists mainly of reaction products from the powder and primer in the cartridge, as well as metal from the projectile. The internal design of suppressors varies by model and manufacturer. In most cases, it is difficult to use common tools such as brushes or picks to effectively clean the inside of a fouled suppressor due to the complexity of the internal design.

Firearm suppressors may be manufactured to allow disassembly for cleaning, or may be sealed so that they cannot be disassembled for cleaning.

Suppressors accumulate residue (fouling) during use that can be difficult to remove. Some suppressors are built so that they can be disassembled for cleaning, and some are sealed and may not be easily disassembled for cleaning. Suppressors contain internal baffles that make it difficult to remove the fouling. Many of the inner surfaces are inaccessible by standard cleaning tools and equipment. Cleaning sealed rifle suppressors is challenging not only because the internal structure of suppressors are complex but also because the fouling is mechanically robust. A further challenge of cleaning suppressors is that the fouling often contains lead and/or copper. Both of these metals are toxic and are expensive to dispose of, particularly if they are dissolved in water or a cleaning solvent. Lead also poses a hazard to anyone attempting to clean a sealed suppressor. Lead that is dissolved in either water or a solvent is an extreme contact hazard. Large volumes of water or other cleaning fluid that might be used to clean fouled suppressors are also a hazard, due to dripping, splashing, or the release of aerosols during cleaning that may carry lead or other toxic materials. Water that drips or spills onto a surface will dry, leaving behind a residue with lead in it that will not go away unless it is cleaned thoroughly. Until it is cleaned, the surface will be a hazard to anyone that enters the cleaning area. A well designed suppressor cleaning system is needed to reduce both the risk of hazard to the user as well as the costs of disposal of the waste that is produced during cleaning. Preferably, it would remove most of the fouling from a suppressor without damaging it (it will not damage either the inside or the outside surfaces). There is also a need to maintain or improve the performance level of the suppressor, and extend the working lifetime of the suppressor.

Firearm suppressors are attached to the firearm; the attachment mechanism varies with the manufacturer. This attachment mechanism may also become fouled and impede normal attachment or detachment of the suppressor. In addition, firearm suppressors may contain features to control the propellant gases, including a Back Pressure Regulator (BPR). Any of these features that come in contact with gases passing through the suppressor may become fouled during service. The present cleaning process can also remove fouling from any of these additional features of the suppressor.

Firearm sound and flash suppressors are designed with an internal structure to divert the gases that both provide energy to the bullet and produce the sound signature. For this function suppressors have internal baffles and complex structures to slow or capture the gases. The propellant released gases, along with any entrained particles of carbon or other material, are slowed by the baffles, and any particulate material is deposited on the internal structure. Particulate materials may be forcefully deposited on the internal structure by impact. Further, the projectile contacts the rifling on the firearm barrel, which removes some of the projectile material (copper alloy jacket, lead, or other materials). Some of this removed projectile material may be deposited in the suppressor. Further, the suppressor may be very hot during use, coming close to or even exceeding the melting point of some of the metals deposited on the suppressor, so that the metals partially or completely liquefy; they may then form a solid coating on the surface of the baffles.

Multiple factors combine to make firearm suppressors difficult to clean. The fouling is deposited at high impact velocity and potentially high temperature, and continued use of a fouled suppressor can consolidate the surface coating. The narrow bore, which can only slightly exceed the diameter of the intended projectile, and the length of the suppressor make access difficult. We and others have found that brushes are ineffective; the flexible bristles may not provide sufficient force to remove fouling. Rigid implements such as dental picks can access only a fraction of the surface, and are ineffective for cleaning the whole suppressor. A high-pressure water stream is diverted by the baffles, and only impacts a fraction of the surface with any suitable velocity.

Further, the fouling may comprise toxic metals including lead, copper and others. In any cleaning process it is important to minimize operator exposure to toxic materials. In particular, metals deposited as fouling are commonly in the elemental state. It is desirable to avoid oxidizing these metals to ions that may be more soluble in water. Even though oxidation of fouling metals may help to remove them, it makes the materials more readily absorbed into and through skin and thus more toxic to users, and also an environmental hazard for disposal of cleaning wastes.

Given the above challenges, some suppressors are designed to allow disassembly for cleaning. See, for example, Proske, U.S. Pat. No. 8,978,818, particularly column 7, lines 28 to 46. In fact, disassembly is the method of choice for suppressors having extensive fouling. However, disassembly is time-consuming, messy, and entails a risk that the unit may not be properly re-assembled, compromising performance. Disassembly may also expose the user to contamination. Further, some suppressor units that are designed to allow disassembly may experience fouling that binds the parts together, such that they cannot be disassembled. In such cases, attempted disassembly may result in parts of the suppressor being damaged, so that the suppressor is no longer operable. For these reasons and others, some suppressors are not designed to be disassembled; these are commonly referred to as sealed suppressors.

The prior art suffers from one or more of the following limitations: it requires disassembly of the suppressor prior to cleaning, it produces a used cleaning solution with soluble toxic metals, it damages the exterior surface of the suppressor, it oxidizes metal such as lead or copper to highly water soluble species, or it is unable to remove fouling material from the internal baffle areas.

BRIEF SUMMARY OF THE INVENTION

The present invention solves the limitations of the prior art and uses ultrasound to clean the inside of fouled suppressors. The ultrasound may be referred to as ultrasound energy or ultrasound waves. The method cleans only the inside of the suppressors and does not expose the external surfaces to cleaning solutions. It is a teaching of the invention to allow thorough cleaning of fouled suppressors without disassembly, although the present invention is effective in cleaning both unsealed and sealed suppressors (and not requiring the unsealed suppressors to be disassembled). A cleaning solution is introduced into the suppressor; the suppressor may be filled or partially filled with the cleaning solution, or the cleaning solution may flow through the suppressor, optionally it may recirculated or recycled for repeated use. The cleaning solution can include water, water with a detergent, a gun-cleaning formulation such as M-Pro7®, or a commercial off the shelf cleaner such as Simple Green. M-Pro7® is a military gun cleaner produced by Pantheon Enterprises, Inc. (Phoenix, AZ). It is a solution of from 75-85 wt % water the balance comprised of diethylene glycol monobutyl ether. Simple Green® is an all-purpose cleaner produced by Sunshine Makers, Inc. (Huntington Beach, CA). It is mixture of water (84.8 wt %), ethoxylated alcohol (5 wt %), sodium citrate (5 wt %), tetrasodium N,N-bis(carboxymethyl)-L-glutamate (1 wt %), sodium carbonate (1 wt %), citric acid (1 wt %), isothiazolinone mixture (0.2 wt %), fragrance (1 wt %), and colorant (1 wt %). In a preferred embodiment of the invention, the cleaning solution does not convert any metals present from the elemental (metallic) form to oxidized species (such as metal ions) that are more readily dissolved or dispersed in water, and are therefore more difficult to remove from the cleaning solution. Thus the cleaning solution preferably does not contain strong oxidizers such as peroxides or strong acids. The cleaning solution may be an aqueous or non-aqueous liquid. It is a teaching of this invention to avoid forming oxidized or otherwise soluble metals, for example water-soluble forms of lead or copper.

During cleaning the suppressors may be sealed on the bottom to prevent the cleaning solution from draining and held upright so that the liquid remains in the suppressor. The cleaning solution may also flow through the suppressor in either a forward or backwards flow direction. We define the proximal end of the suppressor as the end that attaches to the firearm, and the distal end as the end where the projectile exits. The cleaning solution may flow from either the proximal or distal end of the suppressor. An ultrasonic probe (one example is known as a sonic horn microtip) is inserted into the liquid-filled suppressor, and the ultra-sonic generator is operated. The probe may be tapered or non-tapered having a roughly cylindrical-shaped probe distal end. The preferred power setting for sonic probe or sonic horn depends on the sonic tip, Stepped microtips as small as ⅛" at the end may be used, but the larger tapered microtips (¼" at the end) are more durable. The preferred probe is a ½" rod. The smaller the tip at the end, the lower the power that can be put into the probe before it erodes during the cleaning method. The smallest tip (⅛") operated at only 15 Watts erodes quickly while the more preferred ½ rod probe can put out about 200 Watts and last for repeated uses. The higher wattage also cleans more quickly. The ½" probe can be used to put more power into the suppressor but is too big to get between the baffle bore of common suppressors. However, the majority of the fouling is at the first baffle, the sonic energy is then 'shot' down or projected into the bore of the suppressor in the direction of the bullet path to remove fouling material. In an embodiment the probe is non-tapered and the non-tapered shape allows for higher energy outputs without causing damage to the probe tip. For example the energy may be as high as or higher than 200 Watts, which could otherwise cause the end of a tapered tip or a very narrow tip to dissolve or erode over time. The probe may be moved up and down during the treatment in order to clean all areas of the suppressor. The probe may operate outside of the narrowest bore of the suppressor with a probe having a diameter larger than the narrowest part of the suppressor, and the probe may project ultrasonic energy or ultrasonic waves into other portions of the internal cavity. In one embodiment, the ultrasonic treatment time may range from 1-90 minutes, or optionally from 2 to 20 minutes, or from 5 to 15 minutes.

The method of the present invention is in contrast to use of an ultrasonic cleaning bath, in which the item to be cleaned is immersed in a cleaning bath and ultrasonic energy is provided from the exterior of the tank holding the cleaning solution and items to be cleaned. Ultrasonic cleaning baths, such as those manufactured by Magnasonic or iSonic, can be used for cleaning small items. However, it is a teaching of the present patent application that the use of an ultrasonic cleaning bath is not as effective as the methods of the present invention. Further, in some cases the use of an ultrasonic cleaning bath damages the exterior of the suppressor, for example by removing the paint, which may serve as a camouflage (i.e. military uses). The present invention also provides the benefit of reducing the volume of liquid that is needed to clean the suppressor compared to fully immersing the suppressor in a cleaning bath. The present invention avoids this problem because only the inside of the suppressor is exposed to the cleaning solution and the ultrasound.

The internal volume of a suppressor typically ranges from 70-200 mL, which means that the amount of liquid needed to clean a suppressor can be 70-200 mL or even less using the present invention. If a bath is used instead, the suppressor must be fully submerged in the bath. Because a suppressor can be 9" or longer, the volume of the bath must be significantly larger than the internal volume of the suppressor, particularly if multiple suppressors are cleaned at one time. Using a bath, several liters of water or solvent are needed. The bath design also may disturb the finish or the paint that is present on the outside of the suppressor. Suppressors may have a camouflage finish or may be hand-painted by the individual user, and it is critical that the finish is not damaged by the cleaning process. The approach described in the present invention does not damage the outer finish.

The present invention maintains the performance levels of firearm suppressors, and it extends the working lifetime of firearm suppressors. Suppressors can become so fouled that they no longer function properly (for example, do not suppress sound or muzzle flash as well as the un-fouled suppressor, or decrease the accuracy of the firearm), even though the framework of the device is still sound. This is particularly a problem when the suppressor is exposed to a high rate of fire, as can occur on automatic weapons. Fouling can also cause pressure increases that prevent an automatic or semi-automatic firearm from cycling correctly, in effect jamming the firing mechanism. Currently, there are no standard procedures or apparatuses that can be used to clean and maintain a sealed suppressor.

After cleaning, the used solution is removed from the suppressor. The used cleaning solution may be allowed to drain out or removed with assistance of an air stream. The suppressor may optionally be dried, for example in an oven or by flowing air or a gas through the suppressor, either at ambient temperature or heated. One or more rounds of ammunition may be fired through the suppressor to complete the process of removing cleaning solution or debris remaining in the suppressor after the cleaning process. Alternatively, the cleaned and dried suppressor may be treated with an air flow to remove debris, with or without vibration to help dislodge debris.

An embodiment of the invention is a method for cleaning firearm suppressors, the method comprising: providing a used suppressor having an internal cavity with a fouling material deposited on a surface of the internal cavity, and the used suppressor also having an exterior surface; providing a cleaning solution; providing an ultra-sonic probe; introducing the cleaning solution into the internal cavity of the used suppressor; contacting at least part of the ultra-sonic probe with the cleaning solution that is introduced inside the internal cavity of the used suppressor; operating the ultra-sonic probe; removing at least part of the fouling material from the surface of the internal cavity of the used suppressor; and, draining the cleaning solution from the used suppressor. In an optional embodiment the cleaning solution does not wet the exterior surface. In another optional embodiment the cleaning solution flows through the internal cavity of the used suppressor.

In a preferred embodiment the cleaning solution does not oxidize metals in the fouling material.

In an embodiment the used suppressor is a sealed suppressor.

An optional embodiment the method further comprises the step: separating solids from the cleaning solution and optionally recycling the cleaning solution.

In an embodiment, the method further comprises the step of providing a sleeve attached to the used suppressor to extend the fill volume of the used suppressor and preventing spilling of the cleaning solution during the treatment or the method further comprises the step of continuously circulating the cleaning solution through the suppressor being cleaned. Optionally the fouling material removed from the surface of the internal cavity is transported out of the used suppressor by the cleaning solution and is continuously removed from the cleaning solution.

In an optional embodiment, multiple suppressors are cleaned by an automated process.

In a preferred embodiment, the cleaning solution comprises an aqueous solution containing linear, C12, secondary alcohol alkoxylate, polyoxyethylene (4) sorbitan monolaurate, octyldimethylamine oxide, and cocoamidopropyl dimethlamine oxide.

In an embodiment, the probe is a rod with a diameter of from ¼ to ½ inch, and optionally the ultrasonic probe is operated at between 50 and 200 Watts.

In an embodiment the temperature of the cleaning solution is controlled such that it does not exceed 165° F.

In an embodiment, the cleaning solution becomes a used cleaning solution that contains less 0.01 milligrams of water soluble lead and less than 0.01 grams (10 milligrams) of water soluble copper per 1 gram removed fouling material.

An optional embodiment is a method for cleaning firearm suppressors, the method comprising: providing a used suppressor having an internal cavity with a fouling material deposited on a surface of the internal cavity, and the used suppressor also having an exterior surface; providing an extender cup, which is attached to one end of the used suppressor; providing a cleaning solution; providing an ultra-sonic probe; introducing the cleaning solution into the internal cavity of the used suppressor and adding enough cleaning solution to fill the used suppressor and at least partially fill the extender cup, wherein the cleaning solution that at least partially fills the extender cup is in fluid communication with the cleaning solution introduced into the internal cavity of the used suppressor; contacting at least part of the ultra-sonic probe with the cleaning solution that is at least partially fills the extender cup; operating the ultra-sonic probe; projecting ultrasonic energy into the internal cavity of the used suppressor; removing at least part of the fouling material from the surface of the internal cavity of the used suppressor; and, draining the cleaning solution from the used suppressor.

DETAILED DESCRIPTION OF THE INVENTION

Figure 1:
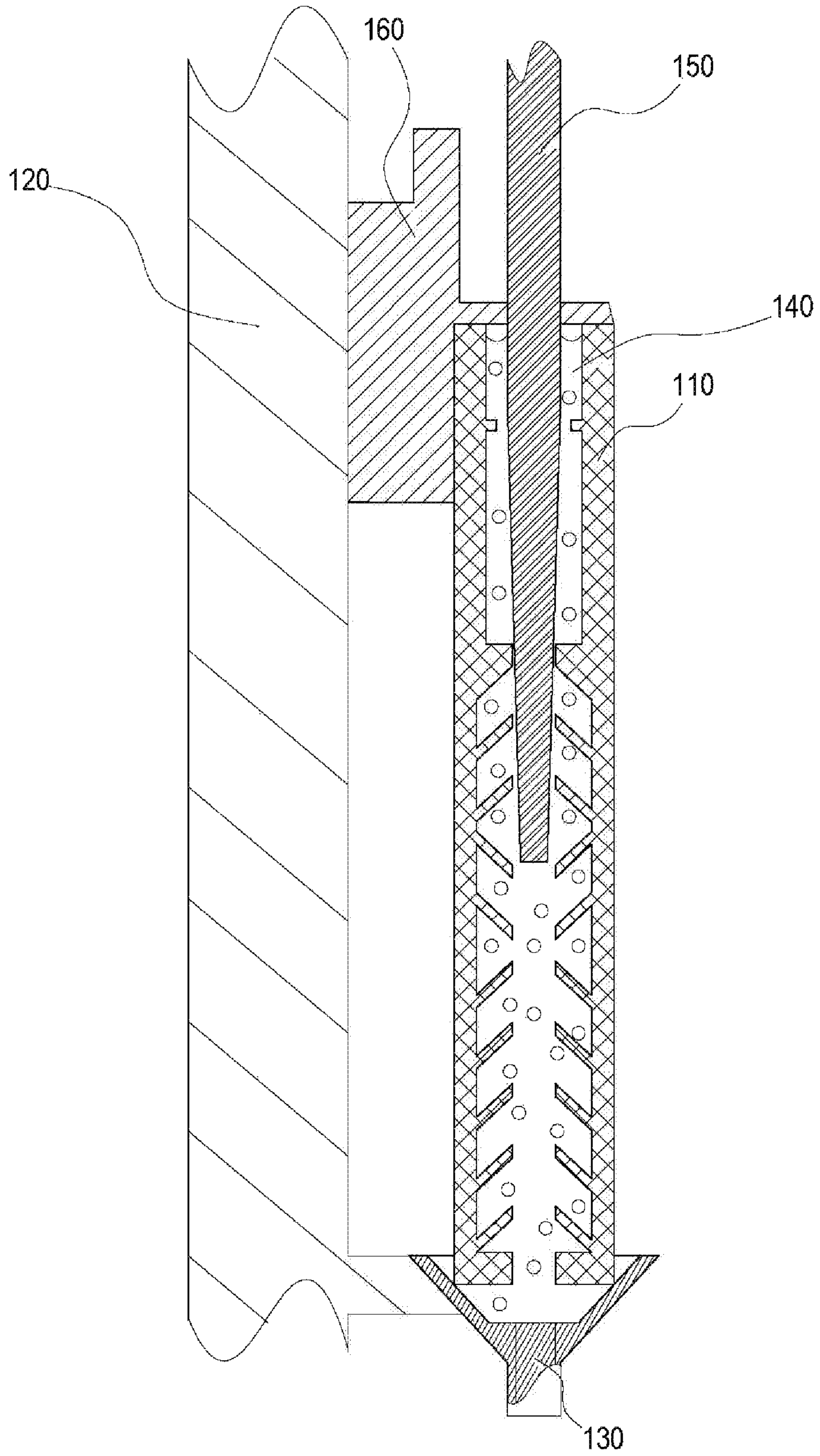
FIG. 1. Cross section of suppressor, holder, cleaning solution and ultrasonic probe inserted deep.

The invention is a method and an apparatus to clean firearm suppressors. The method uses an ultrasonic probe to clean fouling material from the internal surfaces of a suppressor. The suppressor may be sealed on one end so that it is liquid-tight, clamped vertically, and then filled or partially filled with a cleaning solution. Alternatively, the cleaning solution may flow through the suppressor. The cleaning solution may be water, a water-based detergent solution, or a solvent mixture such as a gun-cleaning solvent. Once the suppressor internal cavity is filled, the ultrasonic probe may be inserted into the suppressor and at least partially submerged in the cleaning solution. The probe is clamped, and the position of the probe may be raised or lowered in the suppressor during the ultrasonic treatment or it may be maintained at one level. The top of the suppressor may be fitted with an extender to provide additional volume so that the cleaning liquid will not spill out as the ultrasonic probe is inserted into the suppressor. The extender also allows a larger volume of liquid to be added at the start of the cleaning process. If the probe is only inserted into the first chamber of the suppressor, it may be an advantage to fill the suppressor to a level that is above the top of the suppressor to improve the performance of the ultra-sonic probe: the extender will allow this. Further, an extender may be added to the end of the suppressor that attaches to the rifle so that the cleaning process can also clean the attachment mechanism. In one embodiment a probe tip that is too large to fit inside the narrowest bore portion of a suppressor (i.e. the baffle section) can be used and instead only be inserted into the wider attachment section of the suppressor, just outside of the narrower section. In this case the ultrasonic energy from the probe is transmitted from the probe, through the cleaning fluid and into the narrower sections. A separate probe may be inserted into the opposite end of the suppressor to focus or reflect this ultrasonic energy to specific sections of the baffles inside the internal cavity.

The term "internal cavity of the suppressor" is understood to include the interior of the suppressor as well as any connected features that are exposed to fouling during service.

In the claims, the term "automated process" means an sequential cleaning process utilizing an autonomously operated device, non-limiting examples including a rotating carousel in combination with a robotic arm, a linearly propagating rack with a robotic arm or mechanical device for filling the cleaning solution and operating the ultrasonic probe. Automated processes do not require human operation other than at the start and end of the process.

The term "fouling material" means firearm residue typically deposited on the internal surfaces of suppressors and this may include carbon, lead and copper compounds. Typically the metal exists in a reduced (metallic) state and the carbon may be amorphous, graphite, or other forms of carbon. The fouling material is a result of the discharge of rounds. The fouling material may be annealed or hardened by repeated forces of discharge and the extreme heat associated with rapidly discharging firearms.

The term "cleaning solution" means an aqueous or solvent based solution, preferably an aqueous solution, typically comprising a dilute surfactant solution. The surfactant solution may preferably be an aqueous solution containing linear, C12, secondary alcohol alkoxylate, polyoxyethylene (4) sorbitan monolaurate, octyldimethylamine oxide, and cocoamidopropyl dimethlamine oxide. For example, the surfactant solution is preferably a diluted (5% in water) solution of the surfactant formulation described in Table VIII of U.S. Pat. No. 9,295,865, which is incorporated by reference, herein. Other embodiments include a 50% diluted solution of Simple Green®, M-pro7® gun cleaner, a 5% aqueous solution of Dawn® Ultra Dish Detergent, and the like.

Simple Green® is an all-purpose cleaner produced by Sunshine Makers, Inc. (Huntington Beach, CA). It is mixture of water (84.8 wt %), ethoxylated alcohol (5 wt %), sodium citrate (5 wt %), tetrasodium N,N-bis(carboxymethyl)-L-glutamate (1 wt %), sodium carbonate (1 wt %), citric acid (1 wt %), isothiazolinone mixture (0.2 wt %), fragrance (1 wt %), and colorant (1 wt %).

M-pro7® gun cleaner is 14% diethylene glycol monobutyl ether and the balance is water.

Dawn® Ultra Dish Detergent is an aqueous solution with 15-20 wt % sulfuric acid, nono-C10-16-alkyl esters, sodium salt, 5-10 wt % poly(oxy-1,2-ethanediyl), alpha-sulfo-omega-hydroxy-, C10-16-alkyl ethers, sodium salt, 5-10 wt % amine oxide, C10-16-alkyldimethyl, and 1-5 wt % ethanol.

The term "ultrasonic probe" means an ultrasonic probe, an ultrasonic horn, an ultrasonic booster, an ultrasonic microtip or ultrasonic extender. These ultrasonic probes are attached to an ultrasonic generator. An ultrasonic generator uses a power source and an ultrasonic transducer that vibrates or oscillates in the ultrasound frequency.

The term "ultrasonic" applied to sound waves refers to anything above the frequencies of audible sound, and nominally includes anything over 20,000 Hz.

Operating an ultrasonic probe means supplying power to the ultrasonic transducer while it is mechanically attached to the ultrasonic probe.

As used in the claims, ultrasonic energy or ultrasonic waves mean sounds waves with ultrasonic frequencies propagating through the cleaning solution.

The term oxidized metal includes ionic forms of metal including lead and copper as related to the present invention.

The term water soluble lead refers to oxidize, ionic, complexed or chelated lead chemical compounds or species. For example lead acetate.

The term water soluble copper refers to refers to oxidize, ionic, complexed or chelated copper chemical compounds or species.

In one embodiment, the invention consists of an ultrasonic probe and the equipment needed to drive the probe. It may consist of a mechanism to clamp both the suppressor and the probe, so that the probe can be inserted into the suppressor. It is preferred to clamp the probe and suppressor precisely so that the probe does not contact the inner surfaces of the suppressor during operation. It is also preferred to be able to raise and lower the probe in the suppressor during the cleaning process. This can be done manually or automatically by using a motor, a jack or similar methods. Further, it is preferred to be able to accurately position the probe in the suppressor, so that the cleaning process is consistent from one suppressor to the next and so that a cleaning method can be optimized and reproduced. In another embodiment, the ultrasonic probe may be held at a fixed position, and the suppressor is moved relative to the probe. The suppressor may then be held in one position, or it may be raised and lowered during the treatment process as desired.

The objective is to introduce energy to the interior of the suppressor to help remove fouling. One method is to use a thin probe that fits into the suppressor. However, the interior diameter of the suppressor is only slightly larger than the projectile diameter, and this limits the size of the probe. That in turn can limit the energy output, in particular the output that can be sustained without damaging the probe tip. Therefore, an optional embodiment of the present invention is to use an energy source that is somewhat larger than the interior diameter of the suppressor, placed at one end of the suppressor interior, for example in the muzzle flash attachment that extends beyond the end of the sound baffles, so that a substantial fraction of the energy is transferred into the interior of the suppressor. This embodiment offers a larger output but a smaller fraction introduced into the interior.

A related variation is to introduce an object in the interior channel of the suppressor that at least partially reflects the input energy, so that the energy is concentrated in a particular region or volume of the suppressor.

Additional components of the device used in the method of this invention are parts to seal the bottom of the suppressor to prevent leaks of the cleaning fluid during use as well as a the use of a sealed extension that allow the volume of the cleaning solution to exceed the internal volume of the suppressor; this includes the internal volume of the suppressor with or without the ultrasonic probe inserted. The sealing and extending components allow the suppressor to be treated either through the muzzle end of the suppressor (the end that attaches to the firearm, or the proximal end) or through the exit of the suppressor (where the round exits the suppressor, or the distal end). There may be different sealing and extending components for each of the two orientations of the suppressor, or a single set may serve both purposes. In a further embodiment, there is a drain for removing the cleaning solution from the suppressor either with or without removing the suppressor or the ultrasonic probe from the apparatus or clamping mechanism. We have found that our invention is effective in cleaning the commonly used suppressors with baffles, and also in cleaning the “baffle-less” or flow-through suppressors.

In a further embodiment of the invention, the apparatus is automated and it can treat multiple suppressors simultaneously or sequentially. The apparatus fills the suppressors with a cleaning solution or flows the cleaning solution through the suppressors, treats the suppressors with an ultrasonic probe, and then drains and collects the spent cleaning solution. In a further embodiment of the invention, the apparatus monitors the temperature of the suppressor during the treatment. If the temperature exceeds a specified threshold (e.g. 165° F.), the treatment is paused until it drops to a desired level (e.g. 150° F. or lower). In a further embodiment of the invention, a set temperature is maintained throughout the treatment. A means for heating and/or cooling the suppressor during treatment will be included so that the temperature of the cleaning solution is always in an optimal range during the cleaning process. The heating means or the cooling means may include a heater/chiller bath, an electrical resistive heater, cooling water, a refrigerator, and equivalents thereof. If the cleaning solution flows through the suppressor or suppressors, then the flow rate can be adjusted to produce maximum cleaning, including constant flow rate or pulsed flow.

In an embodiment of the apparatus, multiple suppressors, including the portion or mechanism for attachment to the firearm, will be cleaned simultaneously. The apparatus provides multiple ultrasonic probes so that multiple suppressors can be cleaned at the same time. In another embodiment, a single ultrasonic probe is used. This apparatus may treat a single suppressor at a time, or it may have the means to treat multiple suppressors at a time. If the apparatus treats multiple suppressors at a time, it has the mechanical elements necessary to move suppressors from a queue into the treatment area where the ultrasonic probe is inserted into the suppressor for the cleaning process. These mechanical elements may be comprised of but are not limited to a turntable or carousel that rotates the suppressors into the cleaning position or a robotic arm that lifts and places the suppressors into position.

A further embodiment of the invention is a method to separate solids from the waste cleaning solution. A further option is the ability to recycle the cleaning solution, either with the solids removed, or with the solids still present in the solution.

In an example of the invention, suppressors are loaded into a carousel, with the muzzle end of the suppressor oriented upwards. Each suppressor is held precisely, and a gasket at the bottom of the suppressor seals in cleaning solutions. A sleeve is attached to the top of each suppressor to extend the fill volume of the suppressor and to prevent the spilling of the cleaning solution during the treatment. The carousel rotates the suppressors into the treatment zone, where a pre-determined amount of cleaning solution is pumped into the suppressor. The ultrasonic horn is lowered into the suppressor and partially submerged in the liquid. The suppressor is treated anywhere from 2-60 minutes, and more preferably between 5-30 minutes with the ultrasonic horn. The ultrasonic horn is on a shuttle or similar mechanism, and its position will be adjustable throughout the treatment; in one embodiment, the horn cycles up and down at a precisely controlled rate throughout the cleaning process.

During the cleaning treatment, in one embodiment the temperature of the suppressor is monitored. If the temperature exceeds 160° F., the treatment is paused until the temperature drops to 150° F. At the end of the treatment, the cleaning solution is drained, and the suppressor is rinsed with water. In one embodiment, a cleaned and rinsed suppressor is heated while a stream of air is passed through it in order to dry the suppressor canister. In another embodiment, the cleaned and rinsed suppressor is first drained on a rack, and then returned to service, where it is dried by firing rounds through it.

The present invention provides an apparatus and a method for cleaning that is designed to clean sealed suppressors. An ultrasonic probe inserted into the interior of the suppressor or used near the distal or proximal ends, but while in fluid communication with the interior of the suppressor. Inferior methods teach a method where suppressors are submersed and sealed in a sonicating bath, and cleaned with a mixture of acetic acid and hydrogen peroxide. This technique works because it oxidizes the lead found in the fouling, which helps to remove the fouling. However, it also generates soluble lead (II) acetate or other salts. Solutions of lead salts are hazardous and expensive to dispose of material. Submersion of the suppressor inside a treating bath can also remove the coating on the outside of the suppressor, which is undesired.

The improved method described herein physically removes the fouling found inside of firearm suppressors without chemically oxidizing the heavy metals present in the fouling. This reduces the contact hazard of the waste, reduces the amount (volume) of waste, and also reduces the disposal costs.

The invention is further described in the accompanying Drawings. The reader’s attention is directed to the attached Figures.

In FIG. 1, a suppressor 110, is held by a clamp 120 holding the suppressor vertically. A bottom plug 130 allows a liquid solution 140 to fill the inside of suppressor. An ultra-sonic probe tip 150 is inserted into suppressor from above with tip near the center of suppressor internal space, and submerged in the liquid solution. A removable grip or fastener 160 holds the suppressor in place during cleaning. When the ultra-sonic probe tip is operated it transfers energy to the liquid and facilitates cleaning inside the suppressor.

Figure 2:
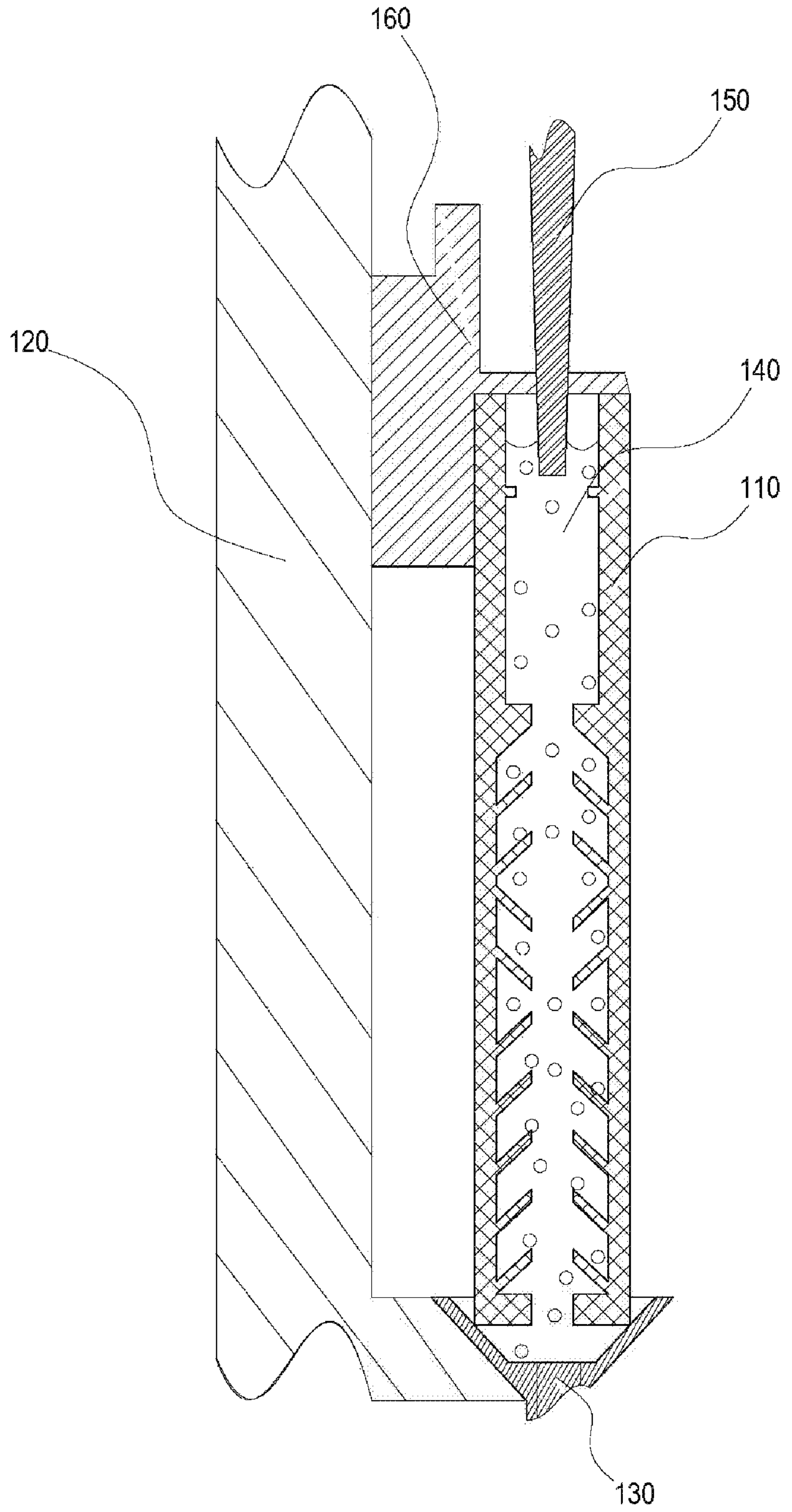
FIG. 2. Cross section of suppressor, holder, cleaning solution and ultrasonic probe inserted shallow.

In FIG. 2, a suppressor 110, is held by a clamp 120 holding the suppressor vertically. A bottom plug 130 allows a liquid solution 140 to fill the inside of suppressor. An ultra-sonic probe tip 150 is inserted into suppressor from above with tip near the upper portion of suppressor internal space, and submerged in the liquid solution. A removable grip or fastener 160 holds the suppressor in place during cleaning. When the ultra-sonic probe tip is operated it transfers energy to the liquid and facilitates cleaning inside the suppressor. Moving the probe tip to different locations in the suppressor during operation can better clean the entrance of the suppressor, under certain conditions.

Figure 3:
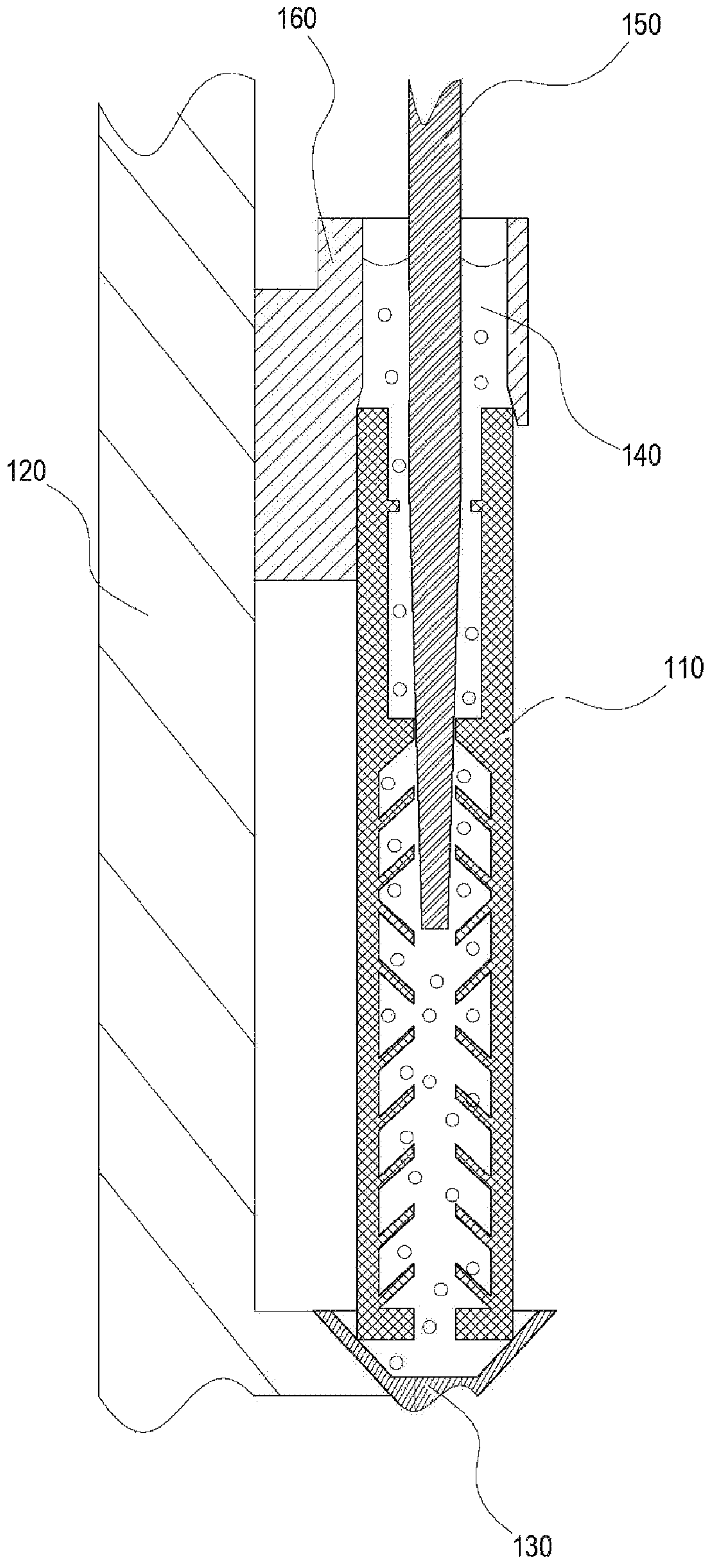
FIG. 3. Cross section of suppressor, holder, cleaning solution and ultrasonic probe with extender cup at the top of the suppressor.

In FIG. 3, a suppressor 110, is held by a clamp 120 holding the suppressor vertically. A bottom plug 130 allows a liquid solution 140 to fill the inside of suppressor. An ultra-sonic probe tip 150 is inserted into suppressor from above with tip near the center of suppressor internal space, and submerged in the liquid solution. A removable grip or fastener 160 holds the suppressor in place during cleaning. The top fastener 160 contains an extension allowing the liquid solution 140 to be filled to a level above the top of the suppressor, effectively increasing the dissolution capacity of the cleaning solution, and without wetting the external surfaces of the suppressor. When the ultra-sonic probe tip is operated it transfers energy to the liquid and facilitates cleaning inside the suppressor.

Figure 4:
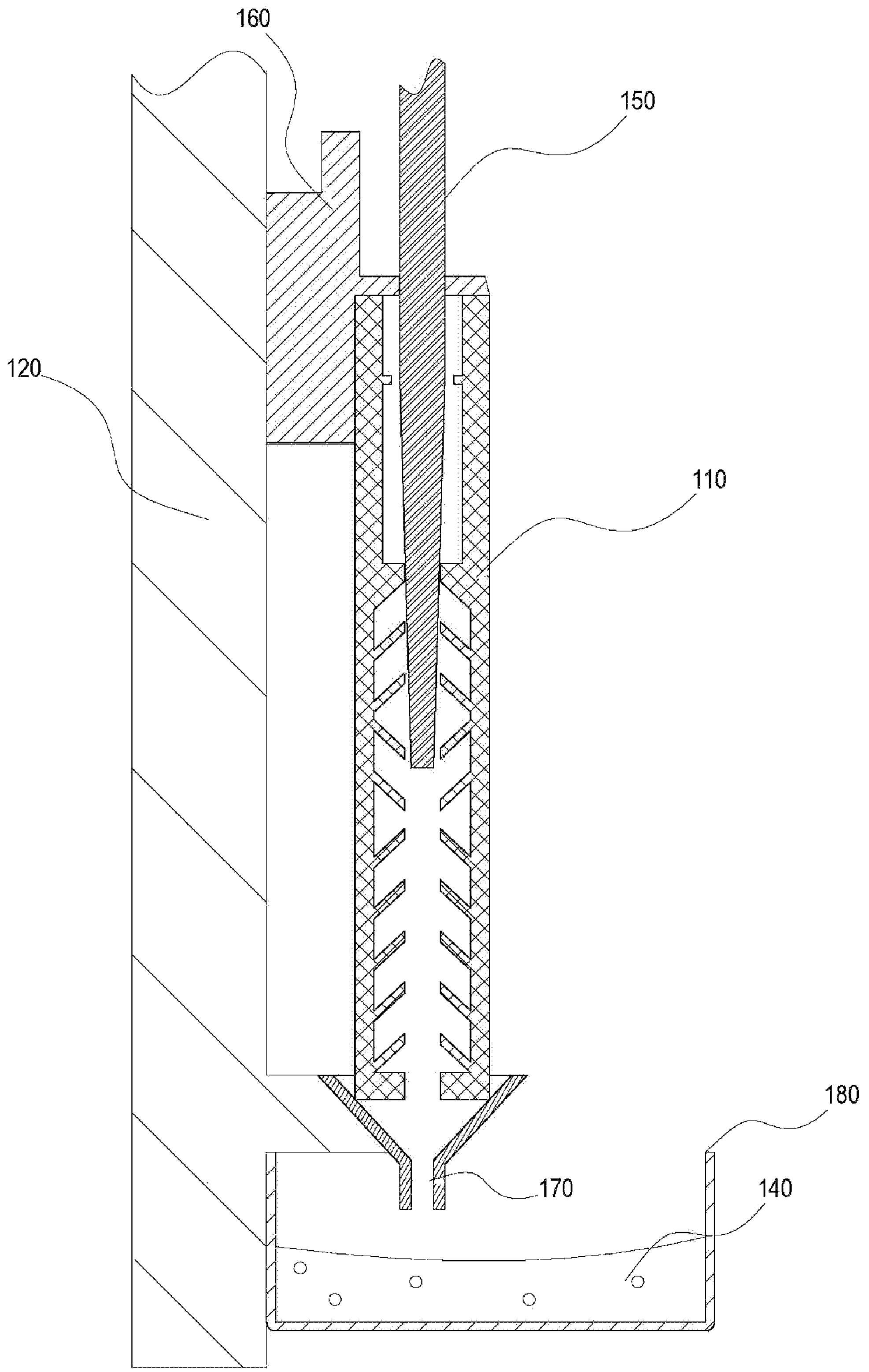
FIG. 4. Cross section of suppressor, holder, cleaning solution and ultrasonic probe with bottom plug removed to drain cleaning solution.

FIG. 4 represents the invention after the ultra-sonic probe has been operated and the liquid has been drained. In FIG. 4, a suppressor 110, is held by a clamp 120 holding the suppressor vertically. A bottom plug 170 is opened to allow a liquid solution 140 to drain from the inside of the suppressor. An ultra-sonic probe tip 150 is inserted into suppressor from above with tip near the center of suppressor internal space, and it is no longer submerged in the liquid solution because the cleaning step is completed. A removable grip or fastener 160 holds the suppressor in place and is attached to the clamp 120. A collection reservoir 180 is mounted below the opened bottom plug 170 to collect the used liquid solution.

Figure 5:
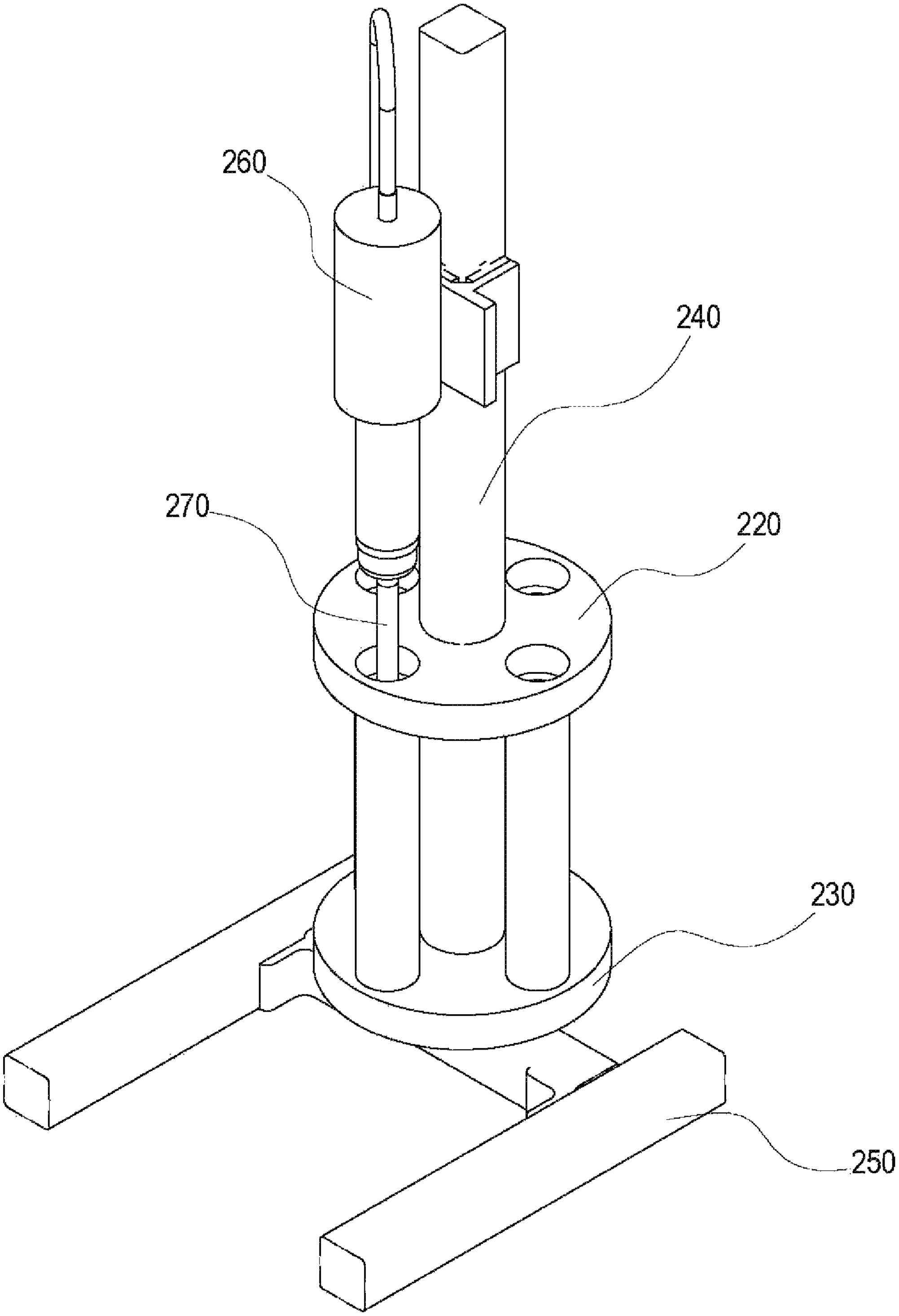
FIG. 5. Carrousel suppressor cleaning apparatus.

FIG. 5 illustrates a multi-suppressor cleaning apparatus. The device has a mount 240, attached to a base 250, which holds a carrousel or multi suppressor holder 220. An ultrasonic generator 260 is attached to a probe tip 270 which is aligned so that it can be inserted into suppressors that are held by the carrousel or multi suppressor holder 220.

Figure 6:
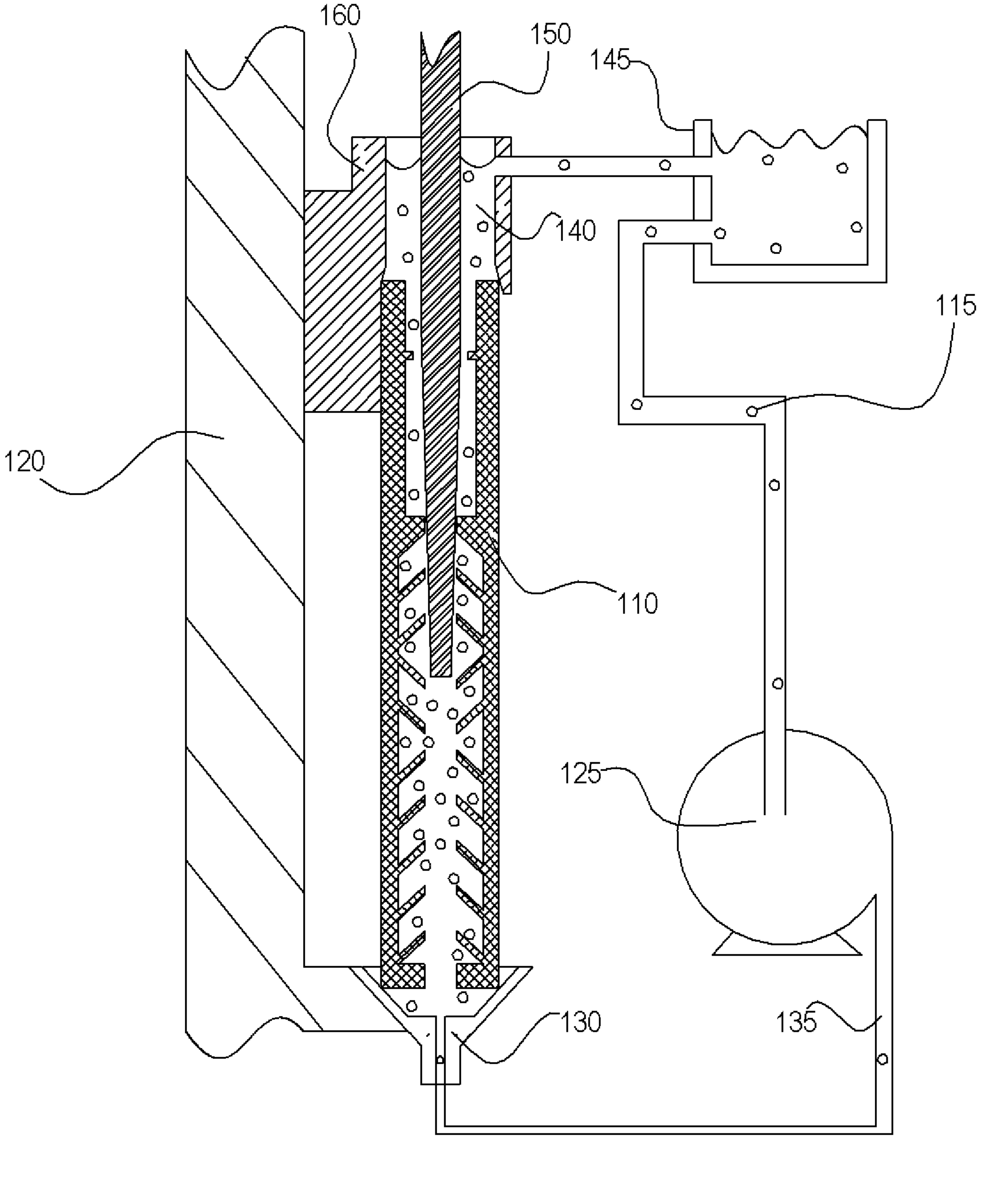
FIG. 6. Cross section of suppressor, holder, cleaning solution and ultrasonic probe with extender cup, reservoir and cleaning solution pump.

In FIG. 6, a suppressor 110, is held by a clamp 120 holding the suppressor vertically. A bottom plug 130 allows a liquid solution 140 to fill the inside of suppressor. An ultra-sonic probe tip 150 is inserted into suppressor from above with tip near the center of suppressor internal space, and submerged in the liquid solution. A removable grip or fastener 160 holds the suppressor in place during cleaning. The top fastener 160 contains an extension allowing the liquid solution 140 to be filled to a level above the top of the suppressor, effectively increasing the dissolution capacity of the cleaning solution, and without wetting the external surfaces of the suppressor. A reservoir 145 is attached with tubing to the extender cup 160 and further attached by tubing 115 to a fluid pump 125, which recirculated the cleaning fluid 140 to the suppressor via a port in the bottom plug 130 via tubing 135. When the ultra-sonic probe tip is operated it transfers energy to the liquid and facilitates cleaning inside the suppressor.

Figure 7:
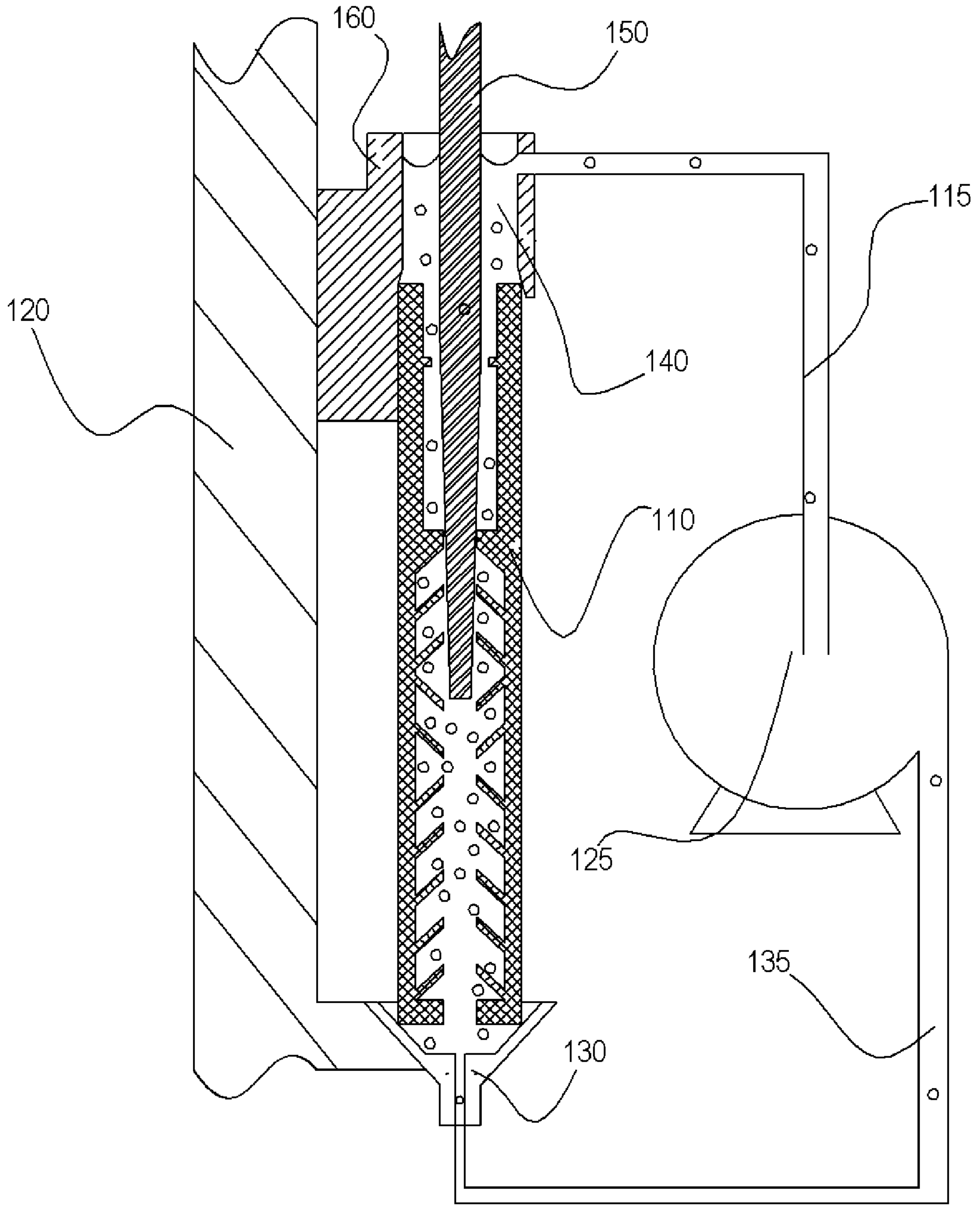
FIG. 7. Cross section of suppressor, holder, cleaning solution and ultrasonic probe with extender cup and cleaning solution pump.

In FIG. 7, a suppressor 110, is held by a clamp 120 holding the suppressor vertically. A bottom plug 130 allows a liquid solution 140 to fill the inside of suppressor. An ultra-sonic probe tip 150 is inserted into suppressor from above with tip near the center of suppressor internal space, and submerged in the liquid solution. A removable grip or fastener 160 holds the suppressor in place during cleaning. The top fastener 160 contains an extension allowing the liquid solution 140 to be filled to a level above the top of the suppressor, effectively increasing the dissolution capacity of the cleaning solution, and without wetting the external surfaces of the suppressor. Attached to extender cup 160 is tubing 115 to transport cleaning solution 140 to a fluid pump 125, which recirculated the cleaning fluid 140 to the suppressor via a port in the bottom plug 130 via tubing 135. When the ultra-sonic probe tip is operated it transfers energy to the liquid and facilitates cleaning inside the suppressor.

Figure 8:
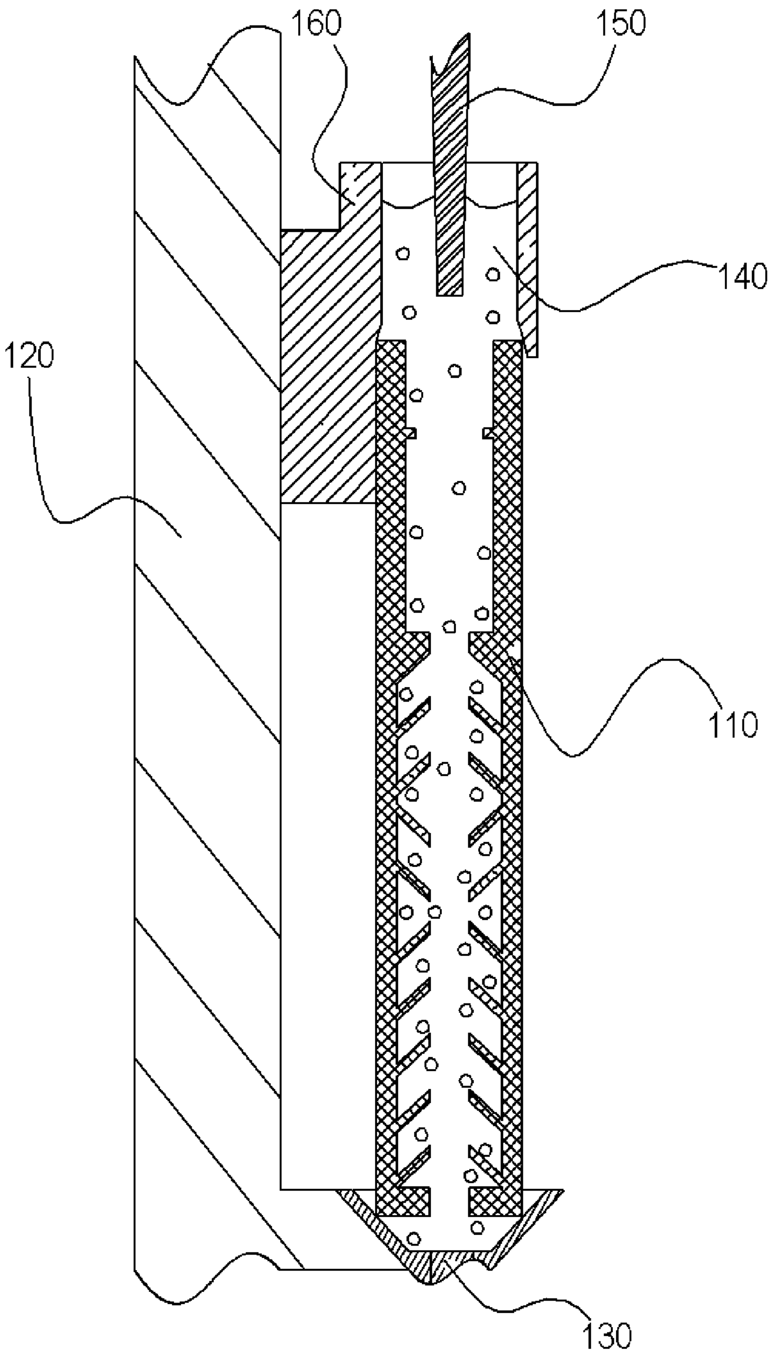
FIG. 8. Cross section of suppressor, holder, cleaning solution and ultrasonic probe only inserted and used in an extender cup.

In FIG. 8, a suppressor 110, is held by a clamp 120 holding the suppressor vertically. A bottom plug 130 allows a liquid solution 140 to fill the inside of suppressor. An ultra-sonic probe tip 150 is inserted into the extender cup from above with tip near the center of suppressor internal space, and submerged in the liquid solution. A removable grip or fastener 160 holds the suppressor in place during cleaning. The top fastener 160 contains an extension allowing the liquid solution 140 to be filled to a level above the top of the suppressor, effectively increasing the dissolution capacity of the cleaning solution, and without wetting the external surfaces of the suppressor. When the ultra-sonic probe tip is operated it transfers energy to the liquid and facilitates cleaning inside the suppressor. Ultrasonic energy is projected into the internal cavity of the suppressor from outside the suppressor.

Figure 9:
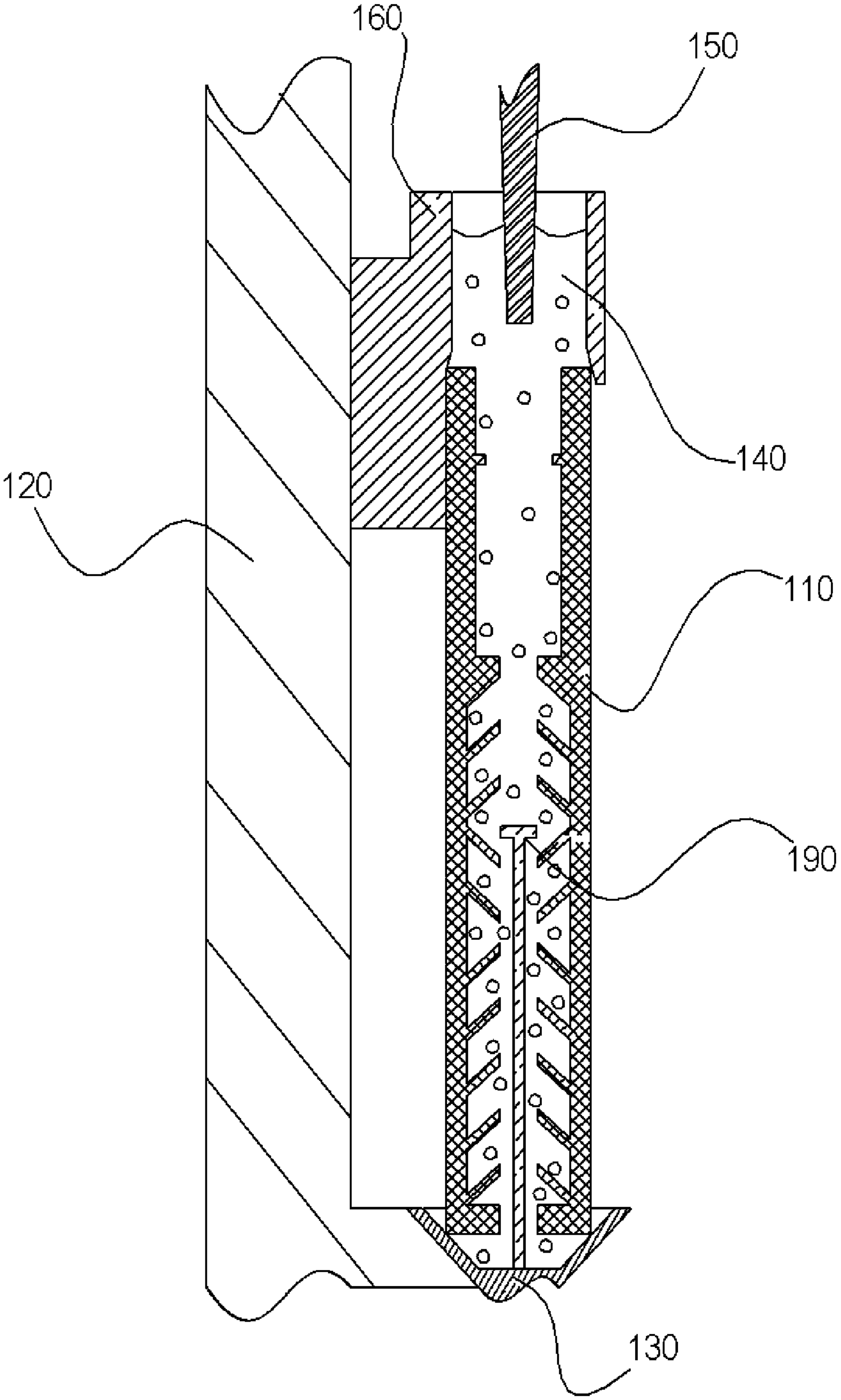
FIG. 9. Cross section of suppressor, holder, cleaning solution and ultrasonic probe only inserted and used in an extender cup and used in combination with an ultrasound reflecting insert.

In FIG. 9, a suppressor 110, is held by a clamp 120 holding the suppressor vertically. A bottom plug 130 allows a liquid solution 140 to fill the inside of suppressor. An ultra-sonic probe tip 150 is inserted into the extender cup from above with tip near the center of suppressor internal space, and submerged in the liquid solution. A removable grip or fastener 160 holds the suppressor in place during cleaning. The top fastener 160 contains an extension allowing the liquid solution 140 to be filled to a level above the top of the suppressor, effectively increasing the dissolution capacity of the cleaning solution, and without wetting the external surfaces of the suppressor. An ultrasound reflecting insert 130 is introduced from the bottom end. When the ultra-sonic probe tip is operated it transfers energy to the liquid and facilitates cleaning inside the suppressor. Ultrasonic energy is projected into the internal cavity of the suppressor from outside the suppressor. The reflecting insert 130 modulates the direction and intensity of the ultrasonic energy inside the internal cavity of the suppressor.

Example 1

In testing with a 5.56 mm suppressor, 1000 rounds were fired through the suppressor. During this testing, the suppressor was cleaned every 200 rounds. The cleaning method used a 7 inch by ½ inch rod ultrasonic probe inserted into the wide proximal end of the suppressor (for example FIG. 2). The cleaning solution comprised 135 grams of an aqueous solution containing linear, C12, secondary alcohol alkoxylate, polyoxyethylene (4) sorbitan monolaurate, octyldimethylamine oxide, and cocoamidopropyl dimethlamine oxide. For example, the surfactant solution (diluted 5% in water) described in Table VIII of U.S. Pat. No. 9,295,865. The suppressor was weighed each time after firing and the amount of weight gain measured immediately after firing was used to determine how much weight gain a suppressor would experience when not cleaned. The suppressor was then cleaned by filling the internal cavity with the cleaning solution and operating the ultrasonic probe at a power setting of 200 Watts (operated intermittently to avoid exceeding a solution temperature of 165° F., then dried by draining and waiting 24 hours and then reweighted. The ultrasonic generator was a Cole Parmer Ultrasonic Processor, Model CP505. The weight gain of the cleaned suppressor was recorded. We found that a cleaned suppressor gained weight 30% slower compared to a suppressor that was not cleaned. Based on muzzle residue analysis, typical residue consists of 70-90% metal content and 10-30% carbon, this shows that the suppressor cleaner is removing a majority of carbon residue.

Analysis of the used cleaning solution (used to clean the suppressor) showed it contained low levels of dissolved metals, with a solution concentration of 308 ppm copper and 0.24 ppm lead. The solid residue removed from the cleaned suppressor had a relatively low density, approximately 2.0 g/cm$^3$. This is very close to the density of amorphous carbon 1.8-2.1 g/cm$^3$. For comparison, the density of copper is 8.96 g/cm$^3$. Therefore, this shows that the solution contains little metals and consists of mostly carbon.

In the case of this 1000 round test, the clean suppressor was 6.85 grams lighter than the weight gain of a suppressor that was not cleaned. Based on the fact that 6.85 grams had a density of 2 g/cm$^3$, the volume of material removed was 3.4 cm$^3$. Based on the remaining 14.4 grams of material likely being primarily metallic copper, the volume of material remaining was 1.6 cm$^3$. Based on a total fouling volume of 5.0 cm$^3$ this indicated that the suppressor cleaner was able to remove 68% of the fouling volume from the suppressor.

The measurements and calculations above show that this method is effective in removing fouling from the suppressor, particularly the less dense, carbon fouling that occupies the a larger proportion of the volume in the suppressor than that occupied by lead and copper fouling. The volume is critical because the suppressor requires empty volume into which the propellant gases can expand and be redirected to lower the sound produced by firearm discharge. In extreme cases the suppressor internal volume can be filled by fouling.

The cleaning methods are also effective on other caliber suppressors including 7.62 mm (.308 inch), 9 mm, and others.

Example 2

Four used S.A.S. Arbiter 7.62 suppressors were cleaned using a tapered ultrasonic probe and a 5% aqueous solution of Dawn® Ultra Dish Detergent for 15 minutes each. The tapered probe was 7 inches long and narrowed down to a ¼ diameter tip. This method also works with a ⅛ inch tip, if a lower power setting (15 Watts) and longer time 2 hours is used. The ¼ inch tip probe was used at 50 Watts. The starting average starting mass of the suppressors was 503.7 grams. The average mass of fouling material was 26.7 grams. An unused suppressor of this model has an average mass of 477 g. After cleaning using the ultrasonic probe (tapered tip) located from 0 to 7 inches into the suppressors (moved up and down during cleaning) and operated for 15 minutes at a power setting of 50 Watts (Cole Parmer Ultrasonic Processor, Model CP505) and drying the suppressors (for 2 hours), 35-45 rounds were fired through each suppressor to clear any residual pre-loosened fouling material. The average weight lost by each suppressor was 16.1 grams and this is approximately 60.3% of the fouling material that was removed by the cleaning method.

Example 3

The used cleaning solution from Example 2 was allowed to settle and the supernatant liquid was decanted off from the solids. The liquid solution and the solids were each then disposed of properly.

Example 4

The separation method of Example 3 was used, but the liquid was retained and reused to clean a second suppressor using the methods of Example 2.

Although the present invention has been described in considerable detail with reference to certain preferred versions thereof, other versions are possible. Therefore, the spirit and scope of the appended claims should not be limited to the description of the preferred versions contained herein, except where required by 35 U.S.C. § 112 ¶ 6 or 35 U.S.C. § 112 (f).

The reader's attention is directed to all references which are filed concurrently with this specification and which are incorporated herein by reference.

All the features in this specification (including any accompanying claims, abstract, and drawings) may be replaced by alternative features serving the same, equivalent or similar purpose, unless expressly stated otherwise. Thus, unless expressly stated otherwise, each feature disclosed in one example only of a generic series of equivalent of similar features. Any element in a claim that does not explicitly state "means for" performing a specified function, or "step for" performing a specific function, is not to be interpreted as a "means" or "step" clause as specified in 35 U.S.C. § 112 ¶ 6 or 35 U.S.C. § 112 (f). Any element in a claim that does explicitly state "means for" performing a specified function, or "step for" performing a specific function, is to be interpreted as a "means" or "step" clause as specified in 35 U.S.C. § 112 ¶ 6 or 35 U.S.C. § 112 (f).

What is claimed is:

1. A method for cleaning firearm suppressors, the method comprising:

a) providing a used suppressor having an internal cavity with a fouling material deposited on a first surface of the internal cavity, and the used suppressor also having an exterior surface;

b) providing a cleaning solution;

c) providing an ultra-sonic probe;

d) introducing the cleaning solution into the internal cavity of the used suppressor;

e) positioning the ultra-sonic probe, such that it does not contact any inner surfaces of the suppressor during operation;

f) contacting at least part of the ultra-sonic probe with the cleaning solution that is introduced inside the internal cavity of the used suppressor;

g) operating the ultra-sonic probe;

h) removing at least part of the fouling material from the first surface of the internal cavity of the used suppressor;

i) draining the cleaning solution from the used suppressor; and further comprising a step of providing a sleeve attached to the used suppressor to extend fill volume of the used suppressor and prevent spilling of the cleaning solution during cleaning.

2. A method for cleaning firearm suppressors, the method comprising:

a) providing a used suppressor having an internal cavity with a fouling material deposited on a first surface of the internal cavity, and the used suppressor also having an exterior surface;

b) providing a cleaning solution;

c) providing an ultra-sonic probe;

d) introducing the cleaning solution into the internal cavity of the used suppressor;

e) positioning the ultra-sonic probe, such that it does not contact any inner surfaces of the suppressor during operation;

f) contacting at least part of the ultra-sonic probe with the cleaning solution that is introduced inside the internal cavity of the used suppressor;

g) operating the ultra-sonic probe;

h) removing at least part of the fouling material from the first surface of the internal cavity of the used suppressor;

i) draining the cleaning solution from the used suppressor; and wherein, the cleaning solution does not oxidize metals in the fouling material; and wherein, the cleaning solution comprises an aqueous solution containing linear, C12, secondary alcohol alkoxylate, polyoxyethylene (4) sorbitan monolaurate, octyldimethylamine oxide, and cocoamidopropyl dimethylamine oxide.

3. A method for cleaning firearm suppressors, the method comprising:

a) providing a used suppressor having an internal cavity with a fouling material deposited on a first surface of the internal cavity, and the used suppressor also having an exterior surface;

b) providing an extender cup, which is attached to one end of the used suppressor;

c) providing a cleaning solution;

d) providing an ultra-sonic probe;

e) introducing the cleaning solution into the internal cavity of the used suppressor and adding enough cleaning solution to fill the used suppressor and at least partially fill the extender cup, wherein the cleaning solution that at least partially fills the extender cup is in fluid communication with the cleaning solution introduced into the internal cavity of the used suppressor;

f) positioning the ultra-sonic probe, such that it does not contact any inner surfaces of the suppressor during operation;

g) contacting at least part of the ultra-sonic probe with the cleaning solution that at least partially fills the extender cup;

h) operating the ultra-sonic probe;

i) projecting ultrasonic energy into the internal cavity of the used suppressor;

j) removing at least part of the fouling material from the first surface of the internal cavity of the user suppressor; and, k) draining the cleaning solution from the used suppressor.

4. The method of claim 3, wherein the ultra-sonic probe is positioned such that it is not inserted into the internal cavity of the used suppressor, and ultrasonic energy is projected into the internal cavity of the used suppressor from outside the suppressor.

* * * * *